(12) United States Patent
Scipioni et al.

(10) Patent No.: US 10,096,021 B2
(45) Date of Patent: Oct. 9, 2018

(54) DIGITAL WALLET LOADING

(71) Applicant: PAYPAL, INC., San Jose, CA (US)

(72) Inventors: German Scipioni, San Jose, CA (US); Loc Nguyen, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 479 days.

(21) Appl. No.: 14/671,965

(22) Filed: Mar. 27, 2015

(65) Prior Publication Data

US 2015/0206135 A1 Jul. 23, 2015

Related U.S. Application Data

(63) Continuation of application No. 13/713,986, filed on Dec. 13, 2012, now Pat. No. 9,015,066.

(60) Provisional application No. 61/570,184, filed on Dec. 13, 2011.

(51) Int. Cl.
*G06Q 20/36* (2012.01)
*G06Q 20/34* (2012.01)
*G06Q 20/38* (2012.01)

(52) U.S. Cl.
CPC .......... *G06Q 20/36* (2013.01); *G06Q 20/342* (2013.01); *G06Q 20/3672* (2013.01); *G06Q 20/387* (2013.01)

(58) Field of Classification Search
USPC .......................................................... 705/21
See application file for complete search history.

(56) References Cited

U.S. PATENT DOCUMENTS

2008/0208742 A1* 8/2008 Arthur ................. G06Q 20/105
705/41
2010/0314442 A1* 12/2010 Hildred ................. G06Q 20/10
235/380

* cited by examiner

*Primary Examiner* — Paul Danneman
(74) *Attorney, Agent, or Firm* — Haynes and Boone, LLP

(57) ABSTRACT

Methods and systems are provided for loading money from a gift card into a digital wallet. The transfer can be done at a point of sale (POS), such as during a purchase of the gift card. The digital wallet can be a digital wallet of a user who is purchasing the gift card. The money in the digital wallet can be used to purchase products from the same merchant or another merchant. The money can be transferred from the digital wallet to any other person or entity.

20 Claims, 5 Drawing Sheets

DIGITAL WALLET LOADING

PRIORITY CLAIM

This application is a continuation of U.S. patent application Ser. No. 13/713,986, filed 13 Dec. 2012, which is hereby incorporated by reference herein in its entirety.

U.S. patent application Ser. No. 13/713,986 claims the benefit of and priority to U.S. Provisional Patent Application No. 61/570,184, filed on 13 Dec. 2011 which is hereby incorporated by reference herein in its entirety.

BACKGROUND

Technical Field

The present disclosure generally relates to electronic commerce and, more particularly, relates to methods and systems for automatically loading a digital wallet with funds, such as from a gift card.

Related Art

Prepaid gift cards are well known. A gift card can be purchased from a merchant, given to a recipient, and used by the recipient to purchase a product. The use of such gift cards substantially simplifies the gift purchasing process. The use of such gift cards allows the recipient to select a product that the recipient wants.

Various merchants offer gift cards. For example, Barnes and Noble, Best Buy, Wal-Mart, Macy's, Applebee's, and The Home Depot offer gift cards. Credit card companies and payment providers offer gift cards. For example, Master-Card, Visa, American Express, and PayPal, Inc. offer gift cards.

Digital wallets, also known as eWallets, are well known. A digital wallet can reside in a user's smart phone and can be used to make a purchase electronically. Purchase transactions can be performed conveniently and safely with a digital wallet.

DETAILED DESCRIPTION

Figure 1:
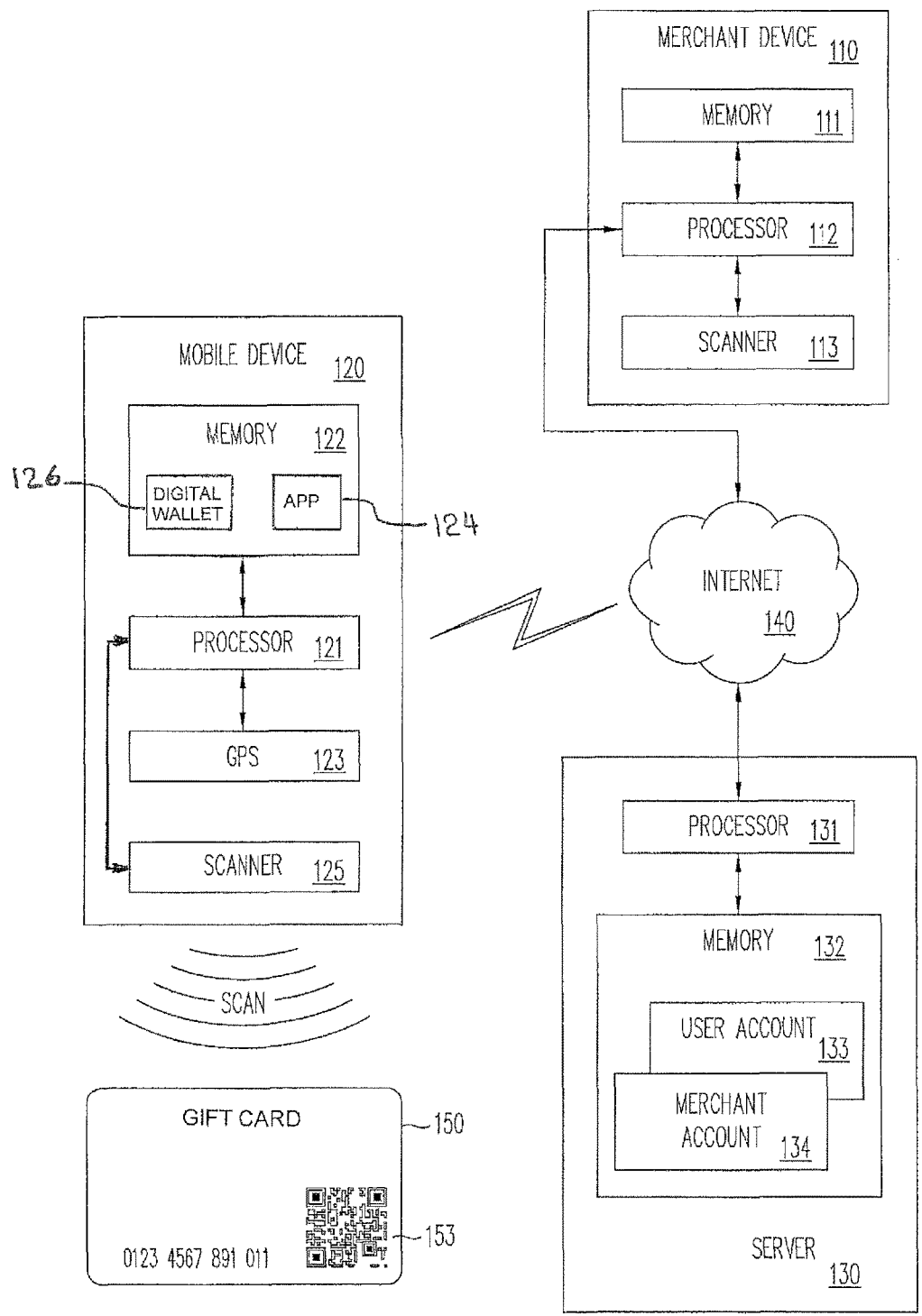
FIG. 1 is a block diagram of a system for digital wallet loading, according to an embodiment.

Methods and systems are provided for loading money from a gift card into a digital wallet. The gift card can be a prepaid gift card. According to an embodiment, the transfer of money can be done at a point of sale (POS), such as during a purchase of the gift card by a user. The digital wallet can be a digital wallet of the user who is purchasing the gift card. The digital wallet can be a digital wallet of any other person or entity. Money in the digital wallet can be used to purchase products from the same merchant or another merchant. The money in the digital wallet can be used to purchase products at any time after the money is loaded into the digital wallet. The money can be transferred from the digital wallet to another person or to an entity.

According to an embodiment, a physical to digital gift card conversion can be performed at the POS. That is, funds from the gift card can be loaded into to the digital wallet at the POS, such as at the time of purchase of the gift card. The digital wallet can be an open digital wallet. As used herein, an open digital wallet can be a digital wallet into which funds can be loaded, such as by the user, a merchant, a payment provider, or the like.

According to an embodiment, the purchased gift card can be associated with the user's existing digital wallet. This can be done at the POS. For example, a unique identifier can be used to identify an account, such as a credit card account, a bank account, or a payment provider account, into which to load the funds from the purchased gift card. An example of such a payment provider is PayPal, Inc. The account can be associated with the digital wallet. The account can define the digital wallet.

The unique identifier can be a payment provider assigned number, a payment provider phone number and personal identification number (PIN), a user's phone number and a PIN, a PIN, a payment provider access card number, a payment provider number, a credit card number, a debit card number, or any other number, code, or device that can be associated with, identify, and/or define the digital wallet. Thus, loading the funds into the digital wallet can comprise loading the funds into a payment provider account or the like. Loading the funds into the digital wallet can comprise loading the funds into an account associated with the digital wallet.

The use of the methods and systems disclosed herein does not require the buyer to access an account management interface to load or associate funds with the digital wallet, as is required according to contemporary practice. Further, such loading or association can be easily and conveniently performed, such as by the user and/or by the merchant, at the time of purchasing the gift card. Such loading or association can be done automatically and/or with little or no user action or intervention.

Purchases can be made with the money transferred from the gift card to the user's digital wallet at the same POS where the gift card was purchased, at a different POS, or anywhere else. Purchases can be made online with the money transferred from the gift card to the user's digital wallet.

Purchases can be made with the money transferred from the gift card to the user's digital wallet using a card (such as the gift card, a credit card, a debit card, a payment provider card, a dedicated digital wallet card, or any other card). Purchases can be made with the money transferred from the gift card to the user's digital wallet using a mobile device, a token (such as a hardware token, a software or virtual token), or any other device. Purchases can be made with the money transferred from the gift card to the user's digital wallet by scanning a code or any visual image or indicia. The code can be displayed on a screen of the mobile device. Purchases can be made with the money transferred from the gift card to the user's digital wallet using any account that is associated with the digital wallet.

Thus, the gift card, the original token (which can be the gift card or any device that can be used as the gift card) or any other device can be associated with the digital wallet and can be used as an access device to the digital wallet, thereby accessing any funds that are stored in the digital wallet. The extent to which other funds (other than the money amount of the gift card) can be accessed by such devices can be limited by the user, an administrator, and/or the system. For example, the extent to which other funds (other than the money amount of the gift card) can be accessed by such devices can be limited to the money amount loaded into the digital wallet from the gift card. The extent to which the money from the gift card can be accessed by such devices can be limited by the user, an administrator, and/or the system. The user can change such limits substantially in real time, as desired.

After the funds have been transferred from the gift card to the user's digital wallet, the user can then send funds electronically to others. For example, the user can send gift cards to intended recipients via the user's digital wallet. Such an electronic funds transfer can be performed by the user with the user's mobile device, personal computer (PC), and/or other computing device. The user can designate one or more other people to make purchases with the user's digital wallet and/or to perform such electronic money transfers from the user's digital wallet.

According to an example, a user can take one or more physical gift cards, other physical cards, or devices that contain money value to a physical POS, such as for a purchase. The purchase can be through a payment provider, such as PayPal, Inc. At the POS, the user can be given the option of having the money value of the physical gift cards, other physical cards, or devices transferred to the user's digital wallet, stored in the user's payment provider account, and/or stored on the user's mobile device. For example, the user can choose to have the money value transferred to the user's digital wallet, which is associated with the user's payment provider account, and which is accessible via the user's mobile device.

If desired, the money amounts from the physical gift cards, other physical cards, and/or other devices can be digitized and stored in the user's digital wallet, payment provider account, and/or mobile device. The user can use the funds to send gift cards electronically to recipients. Thus, the gift cards can be purchased as physical gift cards at the POS, stored (such as automatically) in the user's account or digital wallet, and then used to make purchases and/or given to others.

The user can define how the system makes money transfers from gift cards and the like to the user's digital wallet or account. This can be done during the set up procedure. For example, the user can define if a transfer from the gift card to the user's digital wallet is to occur automatically when the gift card is purchased (such as at a POS offering such automatic transfers). The user can define any limits on such transfers into and/or out of the digital wallet. The user can define specific gift cards that are to be automatically transferred. For example, the user can specify that only America Express gift cards are to be automatically transferred and all other gift cards require user intervention, e.g., authorization, prior to such a transfer. Such definitions can be specified during a set up process for the system.

The user can specify what is to be done with money transferred from a gift card into the user's digital wallet. This can be done during the set up procedure. For example, all or some portion of the money can be automatically transferred to someone else, automatically used to make a purchase, or automatically used to make a payment.

The gift card does not be to have been purchased by the user. For example, the gift card can be purchased by another person and given to the user. The gift card can be a gift to the user.

The system can comprise one or more memories and one or more processors. The one or more memories can store gift card information for a user. For example, the one or more memories can store an identification of the gift card, such as a gift card number. The one or more memories can store other gift card information, such as a money amount of the gift card, a purchase date of the gift card, an expiration date of the gift card, an issuer name for the gift card. The one or more memories can store information regarding the user. For example, the one or more memories can store a name of the user, a home address of the user, an employer of the user, contact information for the user (such as a telephone number, text messaging number, and/or email address for the user), and/or a purchase history for the user.

The one or more processors can be operable to receive a communication. The communication can be from the user's mobile device, the merchant device, or any other device. The communication can be via near field communication (NFC), Bluetooth, a local area network (LAN), a wide area network (WAN), a telephone network (such as a voice or data cellular telephone network), or any other network or combination of networks.

The communication can include an indication of a desire of the user to load a gift card into a digital wallet. The digital wallet can be a digital wallet of a mobile device, such as a mobile device of the user. For example, the one or more processors can be operable to receive a communication from the user, such as via the user's mobile device and/or a merchant device. The communication can be received during a purchase of the gift card, immediately after the purchase of the gift card, or at any other time. For example, the communication can be received by the merchant device and/or a server.

The one or more processors can access the gift card information of the user. For example, the one or more processors can access the gift card information stored in the mobile device, the merchant device, a server, or any other device. The one or more processors can cooperate with the mobile device to transfer a money amount from the gift card into the digital wallet.

A method can comprise storing, such as in one or more memories, gift card information for the user. The method can further comprise receiving, such as via one or more processors, a communication including an indication of a desire of the user to load a gift card into a digital wallet of a mobile device. More particularly, the communication can indicate that the user wants to load a money amount from the gift card into the digital wallet. The money amount can be the money amount of the gift card or any portion thereof. The method can further comprise accessing, such as via the one or more processors, the gift card information of the user and cooperating the one or more processors with the mobile device to transfer a money amount from the gift card into the digital wallet.

The one or more memories can be one or more memories of a merchant device. The one or more processors can be one or more processors of the merchant device. The merchant device can be located at a point of sale (POS) where the gift card was purchased or can be located anywhere else.

The one or more memories can be one or more memories of a server. The one or more processors can be one or more processors of the server. The server can be located remotely with respect to the point of sale (POS) where the gift card was purchased or can be located anywhere else.

The one or more memories can be one or more memories of a user's mobile device. The one or more processors can be one or more processors of the user's mobile device. The user's mobile device can be located at a point of sale (POS) where the gift card was purchased or can be located anywhere else.

The one or more memories and/or the one or more processors can be memories and/or processors of any device or combination of devices and can be at any location. Thus, the one or more memories and/or the one or more processors can be memories and/or processors of any combination of the merchant device, the server, and/or the user device.

The digital wallet can be located at the point of sale (POS) when the money amount is transferred from the gift card to the digital wallet. The digital wallet can be located remotely with respect to the point of sale (POS) when the money amount is transferred from the gift card to the digital wallet. The digital wallet can be at any location when the money amount is transferred from the gift card to the digital wallet. The digital wallet can be in a device that is with the user when the money amount is transferred from the gift card to the digital wallet. The digital wallet can be in a device that is not with the user when the money amount is transferred from the gift card to the digital wallet. The digital wallet can lack a well-defined location. The digital wallet can be in the cloud.

The money amount from the gift card can be split among a plurality of separate digital wallets. The plurality of separate digital wallets can be a plurality of separate digital wallets of the same user or can be a plurality of separate digital wallet of different users.

The money amount can be transferred from a plurality of separate gift cards to a single digital wallet. The money amount can be transferred from a plurality of separate gift cards to a plurality of digital wallets. The number of gift cards and the number of digital wallets involved in such a money transfer can be the same number or can be a different number. The money amount can be transferred from any number of separate gift cards to any number digital wallets. For example, two $100 gift cards ($200 total) can be transferred in equal amounts to four separate digital wallets, resulting in a transfer of $50 to each digital wallet. As a further example, three $50 gift cards ($150 total) can be transferred in equal amounts to two separate digital wallets, resulting in a transfer of $75 to each digital wallet.

The user can merely specify that equal amounts are to be transferred from the gift cards and/or equal amounts are to be transferred into the digital wallets and the system can determine the dollar amounts. Thus, in the first example of the paragraph above, the user can merely specify that all of the money from the two $100 gift cards ($200 total) is to be split equally among the four digital wallets and the system can then transfer $50 to each digital wallet. Thus, the user does not need to determine the money amounts. Alternatively, the user can specify the money amounts to be transferred, such as from each gift card and/or to each digital wallet.

The user can specify that unequal amounts are to be transferred from the gift cards and/or unequal amounts are to be transferred into the digital wallets and the system can determine the dollar amounts. The user can specify the proportions from which money is to be taken from the gift cards and/or can specify the proportions to which money is to be put into the digital wallets. For example, the user can specify that 100% of one gift card is to be transferred into a first digital wallet, 60% of another gift card is to be transferred into a second digital wallet, and 40% of the other gift card is to be transferred into a third digital wallet.

Combinations of proportions and dollar amounts can be specified. For example, the user can specify that $60 of a gift card is to split among three digital wallets with the first digital wallet receiving two thirds ($40) of the money and the other two digital credit wallets equally splitting the remaining amount (and thus receiving $10 each). Thus, money amounts from gift cards and/or to digital wallets can easily and conveniently be designated in dollar amounts or in proportions, such as fractions or percentages, to more readily facilitate desired allocations of the money.

Any remainder from a split can be given to the first specified digital wallet, can be rotated sequentially among digital wallets each time there is such a remainder (first time to the first digital wallet, next time to the second digital wallet, and so forth), can be assigned to a digital wallet randomly, can be given to a charity, can be left on the gift card, or can be handled in any other desired manner. The remainder can be used to can offset banking, credit card, or payment processor fees. For example, if $100 from one or more gift cards is specified to be split equally among three digital wallets, then the remainder of one cent can be given to the first specified digital wallet of the three.

The one or more processors can be operable to transfer the money amount from the gift card into the digital wallet substantially at a time when the gift card is purchased at the point of sale (POS). The one or more processors can be operable to transfer the money amount from the gift card into the digital wallet at a time after the gift card is purchased. The amount of time can be relatively short, such as hours or days after the purchase. The amount of time can be relatively long, such as weeks or months after the purchase. The one or more processors can be operable to transfer the money amount from the gift card into the digital wallet at any desired time, such as at a time specified by the user. The time for the transfer can be specified as a time, date, time and date, or an elapsed time or period (such as, two weeks) after the purchase.

The gift card can be a physical gift card. The gift card can be a virtual gift card. The gift card can be any type of gift card. The one or more processors can be further operable to transfer money from the digital wallet to a specified recipient.

A computer program product can comprise a non-transitory computer readable medium. The computer readable medium can have computer readable and executable code for instructing one or more processors to perform any method discussed herein.

FIG. 1 is a block diagram of a system for digital wallet loading, according to an embodiment. The system can include a merchant device 110, a mobile device 120, and/or a server 130. Other devices are contemplated. The functions discussed herein can be split and/or shared amount the merchant device 110, the mobile device 120, the server 130 and/or any other devices, as desired.

The merchant device 110 can be a merchant checkout terminal, a computer, and/or a server, for example. The merchant device 110 can include a memory 111 and a processor 112. The merchant device 110 can be used for loading, such as either automatically or manually (requiring user intervention or authorization), money from a gift card 150 into a digital wallet 126. The digital wallet 126 can be a digital wallet of the mobile device 120. A program for facilitating such loading can be stored in the memory 111, for example.

The merchant device 110 can include a scanner 113. The scanner 113 can be used to scan the gift card 150 to facilitate loading of money therefrom into the digital wallet 126. For example, the scanner 113 can scan a quick response (QR)

code 153 of the gift card 150. The quick response (QR) code 153 can identify the gift card and provide other information, as discussed herein.

The scanner 113 can be used to scan the mobile device 120. For example, the scanner 113 can be used to scan a screen of the mobile device 120. The screen of the mobile device 120 can display a code, such as a bar code, quick response code (QR), or any other code that can be scanned.

The scanner 113 can be a wireless scanner. For example, the scanner 130 can scan a radio frequency identification (RFID) code or a Bluetooth code of the mobile device 120. Such a wireless code can be used to identify the mobile device 120, the digital wallet 126, and/or an account associated therewith.

The mobile device 120 can be carried by the user. The mobile device 120 can be a cellular telephone, a smart telephone, a hand held computer, a laptop computer, a notebook computer, or a tablet computer, for example. The mobile device 120 can include a processor 121, a memory 122, and a global positioning system (GPS) 123. The memory 122 can store the user's digital wallet 126. An app 124 can be stored in the memory 122 and can be executed by the processor 121. The app 124 can facilitate loading of money from the gift card 150 into the digital wallet 126. The mobile device 120 can be used for routine telephone calls, text messaging, web browsing, and the like, as well as for storing and managing the digital wallet 126.

The mobile device 120 can include a scanner 125. The scanner 125 can be used to scan the gift card 150 to facilitate loading of money therefrom into the digital wallet 126. Thus, the user can use the scanner 125 to scan the gift card 150 to facilitate loading of the gift card into the digital wallet 126. For example, the scanner 125 can scan a quick response (QR) code 153 of the gift card 150. The scanner 125 can be used to scan the screen of another mobile device. The gift card can be displayed on the screen of another mobile device or on any other screen can be scanned by the user's mobile device, such as to effect transfer of the money amount of the gift card (or a portion thereof.

The scanner 113 of the merchant device 110 and/or the scanner 125 of the mobile device 120 can be a camera, a laser scanner, an optical scanner, a QR scanner, a barcode scanner, a radio frequency scanner, a RFID scanner, or a Bluetooth scanner. The scanner 113 of the merchant device 110 and/or the scanner 125 of the mobile device 120 can be any desired type of scanner.

The system can include a server 130. The server 130 can be a payment server. The server 130 can be a server of a payment provider, such as PayPal, Inc. The server 130 can be any other type of server. The server 130 can be a single server or can be a plurality of servers. The server 130 can include one or more processors 131 and one or more memories 132. The memory 132 can be a memory of the server 130 or can be a memory that is associated with the server 130. The memory 132 can be a distributed memory.

The memory 132 can store a user account 133 and a merchant account 134. The user account 133 can contain information identifying and regarding the user, gift cards purchased by the user, gift cards given to the user, gift cards given by the user, purchases made by the user, account balances, digital wallet identification and balances, and any other desired information. The merchant account 134 can contain information identifying and regarding a plurality of merchants, products of the merchants, prices of the products, any incentives being offered, and the like.

The server 130 can be located at a store of the merchant, e.g., at the POS. The server 130 can be located remotely with respect to the POS. The server 130 can be located at facility of the payment provider. The server 130 can be at any desired location.

The server 130 can be used for managing an account of the user. For example, the server 130 can be used for managing a payment provider account for the user. The server 130 can execute software that facilitates the loading of the digital wallet 126 with money from the gift card 150.

The server 130 can execute account management software, including an account management interface. The account management interface does not have to be used by the user to load money from the gift card 150 to the digital wallet 126. The account management interface can be used by the user to load money from the gift card 150 to the digital wallet 126.

Generally, the merchant device 110, the mobile device 120, and the server 130 can perform any or selected ones of the functions discussed herein. That is, at least to some extent, a function that is discussed herein as being performed via a specified one of these devices can be performed by a different one of these devices or by a combination of these devices.

The merchant device 110, the mobile device 120, the other mobile devices 130, and the server 130 can communicate with one another via a network, such as the Internet 140. The merchant device 110, the mobile device 120, the other mobile devices 130, and the server 130 can communicate with one another via one or more networks, such as local area networks (LANs), wide area networks (WANs), cellular telephone networks, and the like. The merchant device 110, the mobile device 120, the other mobile devices 130, and the server 130 can communicate with one another, at least partially, via one or more near field communications (NFC) methods or other short range communications methods, such as infrared (IR), Bluetooth, WiFi, and WiMax.

The merchant device 110, the mobile device 120, and/or the server 130 can communicate with a social networking site. For example, the merchant device 110, the mobile device 120, or the server 130 can communicate with a social networking site such as Facebook to communicate information regarding purchases and/or money transfers of the user. This can be done, for example, so that a parent can better monitor the activities of a child. The user can determine, such as during the set up procedure, which, if any, social networking sites are communicated with and what information is communicated.

FIG. 1 illustrates an exemplary embodiment of a network-based system for implementing one or more processes described herein. As shown, the network-based system may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or another suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Figure 2:
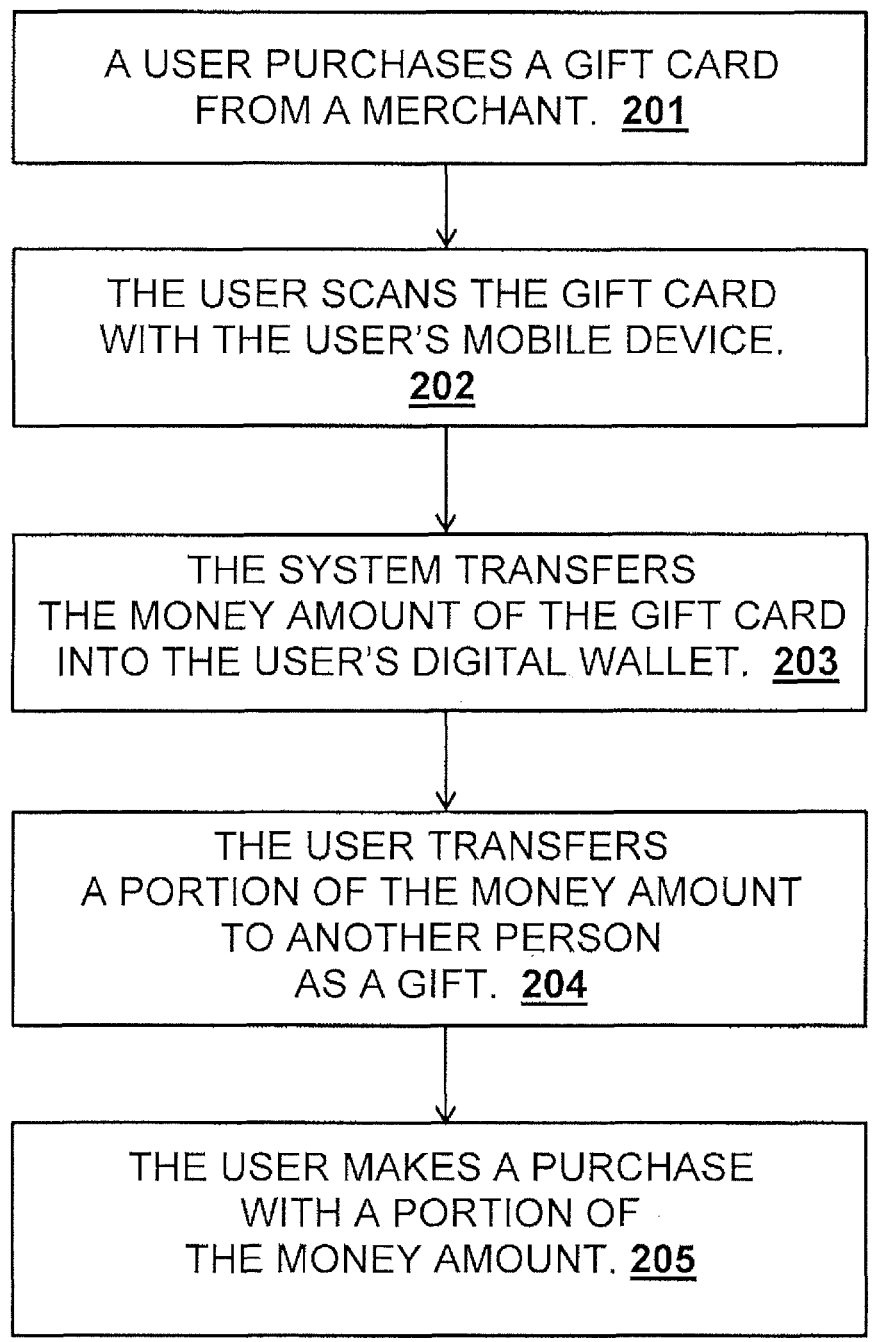
FIG. 2 is a flow chart showing a method for digital wallet loading, according to an embodiment.
Figure 3:
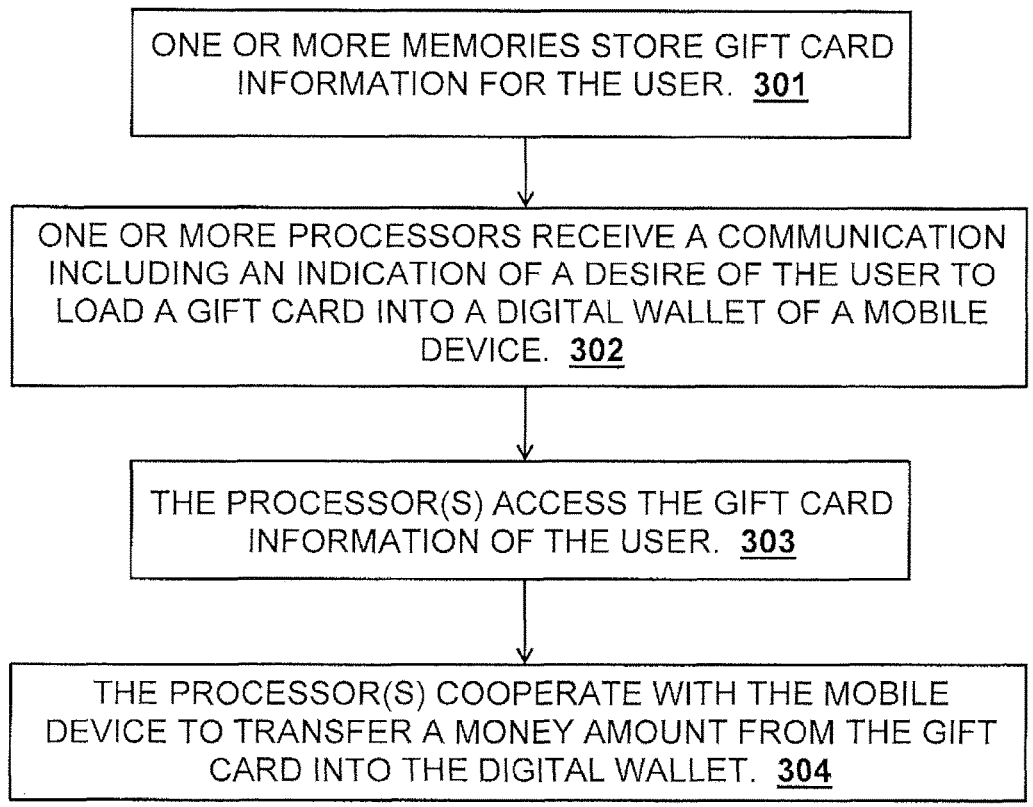
FIG. 3 is a flow chart showing further detail of the method for digital wallet loading, according to an embodiment.

FIGS. 2 and 3 are flow charts that describe examples of operation of the system for digital wallet loading according to embodiments thereof. Note that one or more of the steps described herein may be combined, omitted, or performed in a different order, as desired or appropriate.

FIG. 2 is a flow chart showing a method for digital wallet loading, according to an embodiment. A user can purchase the gift card 150 from a merchant, as shown in step 201. The merchant can be a brick and mortar store merchant with a POS. The merchant device 110 at the POS can be used for loading the money amount of the gift card or some portion thereof into the digital wallet 126.

The merchant can be an online merchant and the user can take the gift card to an associated or compatible POS for loading the money amount of the gift card or some portions thereof into the digital wallet 126. The associated or compatible POS can have the merchant device 110. The user can take the gift card to a device of a payment provider, such as a merchant device 110 and/or a server 130 to load the money amount from the gift card into the digital wallet 126. The merchant device 110 and/or the server 130 can facilitate the transfer of money from the gift card 150 to the digital wallet 126.

The user can scan the gift card 150 with the user's mobile device 120, as shown in step 202. Thus, the user can obtain an identification or account number associated with the gift card. For example, the user can use the scanner 125 of the mobile device 120 to scan the QR code 153 of the gift card 150. The scan can indicate the money amount of the gift card 150. The money amount of the gift card 150 can be displayed on the mobile device 120 after the scan. Other information, such as the issuer of the gift card 150 can similarly be displayed.

The scan can directly indicate the money amount of the gift card 150. That is, the money amount can be included in the scanned information. The scan can indirectly indicate the money amount of the gift card 150. That is, the scan can identify the gift card 150 such that the money amount can be accessed via a database, such as a database of the gift card issuer.

The system can transfer the money amount of the gift card 150 into the user's digital wallet 126, as shown in step 203. The money amount of the gift card 150 can be transferred to the user's digital wallet 126 using contemporary money transfer protocols and safeguards. The user can be notified when the transfer is complete.

The user can, if desired, transfer a portion of the money amount to another person as a gift, as shown in step 204. The gift can effectively be a gift card for the other person. The gift card for the other person can be printed or otherwise made, such as by the other person or by a merchant, such as at a POS, or by an entity such as the payment provider. The gift card can be mailed from the POS, payment provider, or other entity to the gift recipient or to the user.

The user can make a purchase with a portion of the money amount, as shown in step 205. The user can generally use any money from the gift card via the digital wallet 126 as though the money is still in the gift card or as though the money is in the digital wallet 126.

According to an embodiment, the physical gift card 150 can be used as thought the money amount was not transferred. Thus, the user can have a choice between using the digital wallet 126 and the gift card 150. The system described herein and/or a payment provider system can keep tract of usage of the gift card and/or the digital wallet to inhibit abuse thereof.

Any desired portion of the money amount of the gift card can be loaded into the digital wallet 126. Thus, all of the money amount of the gift card 150 need not be loaded into the digital wallet 126. All of the money amount of the gift card 150 can be loaded into the digital wallet 126.

The merchant can offer incentives to purchase the gift card from the merchant and/or to use the gift card with the merchant. For example, the merchant can offer a discount on the gift card and/or merchandise to users that purchase the gift card from the merchant, transfer the gift card to their digital wallet at the merchant's POS, and then shop with the merchant.

FIG. 3 is a flow chart showing further detail of the method for digital wallet loading, according to an embodiment. One or more memories can store gift card information for the user, as shown in step 301. The one or more memories can include the memory 111 of the merchant device 110, the memory 122 of the mobile device 120, and/or the memory 132 of the server 130.

One or more processors receive a communication including an indication of a desire of the user to load a gift card into a digital wallet of a mobile device, as shown in step 302. The one or more processors can include the processor 112 of the merchant device 110, the processor 121 of the mobile device 120, and/or the processor 131 of the server 130.

The processor(s) can access the gift card information of the user, as shown in step 303. The processor(s) cooperate with the mobile device to transfer a money amount from the gift card into the digital wallet, as shown in step 304.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Payment processing can be through known methods, such as transaction details being communicated to the payment provider through the app, the payment provider processing the details, which may include user account and identifier information and authentication, merchant information, and transaction details. The user account may be accessed to determine if any restrictions or limitations may prevent the transaction from being approved. If approved, the payment provider may send a notification to the merchant and/or the user.

Figure 4:
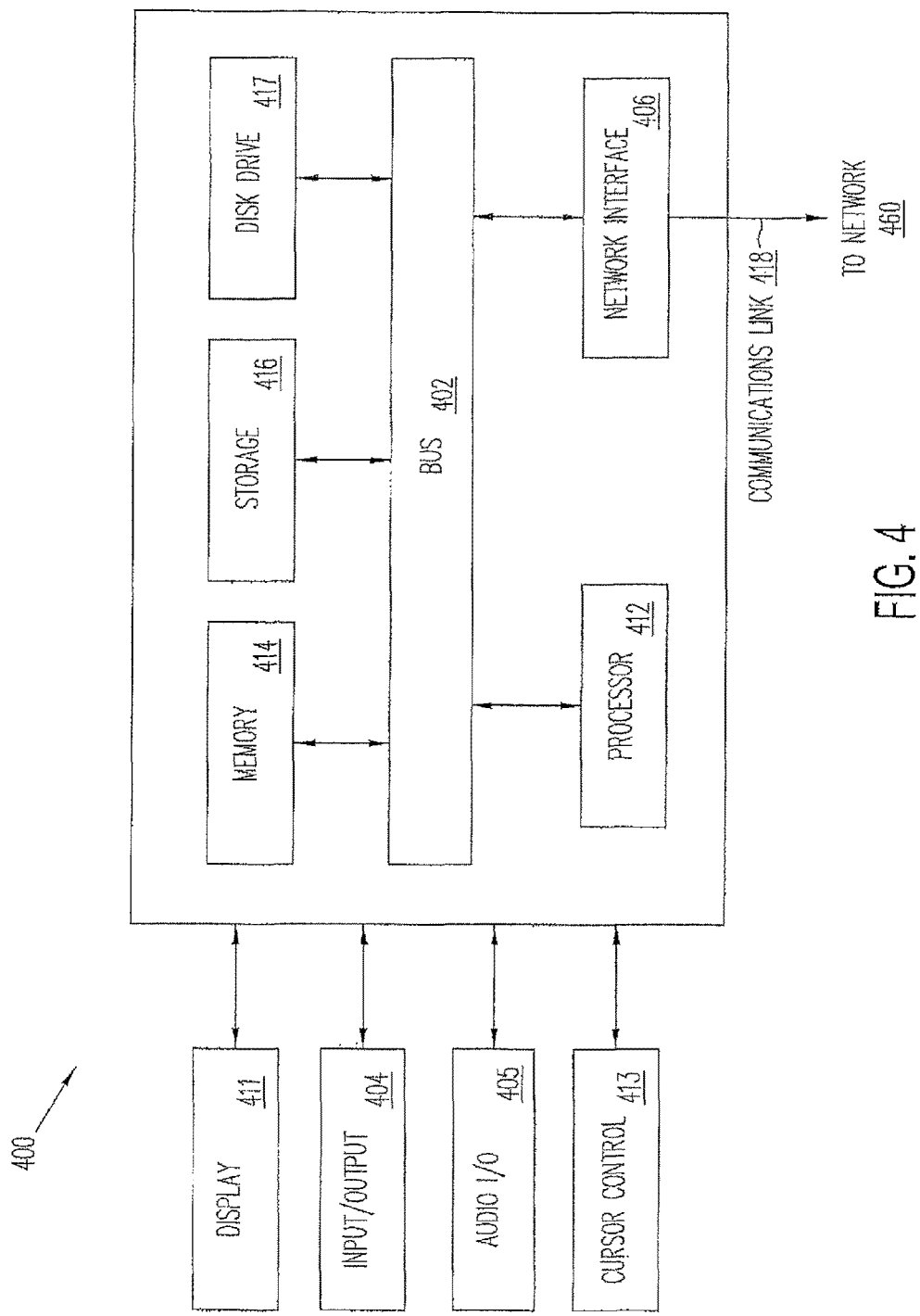
FIG. 4 is a block diagram of an example of a computer that is suitable for use in the system for digital wallet loading, according to an embodiment.

FIG. 4 is a block diagram of a computer system 400 suitable for implementing one or more embodiments of the present disclosure. In various implementations, the PIN pad and/or merchant terminal may comprise a computing device (e.g., a personal computer, laptop, smart phone, tablet, PDA, Bluetooth device, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another. Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Figure 5:
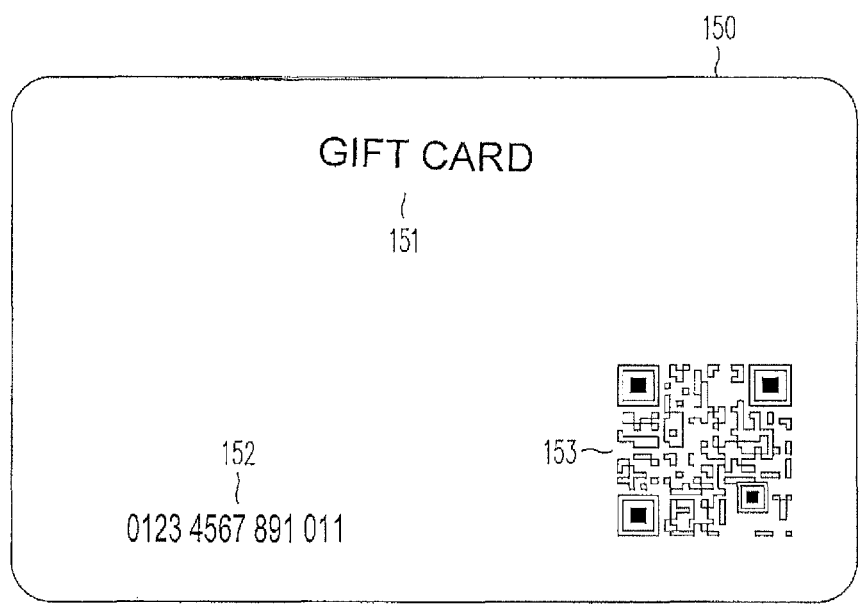
FIG. 5 is an example of a gift card that is suitable for use in the system for digital wallet loading, according to an embodiment.

FIG. 5 is an example of a gift card that is suitable for use in the system for digital wallet loading, according to an embodiment. The gift card 150 can include a name 151, such as an issuer name, an identification number 152 and the QR code 153. The QR code 153 can be the identification number 152, can include the identification number 152, or can be different from the identification number 152.

As used herein, the term "store" can include any business or place of business. The store can be a brick and mortar store or an online store. The store can be any person or entity that sells a product.

As used herein, the term "product" can include any item or service. Thus, the term "product" can refer to physical products, digital goods, services, or anything for which a user can make a payment, including charitable donations. A product can be anything that can be sold. Examples of products include cellular telephones, concerts, meals, hotel rooms, automotive repair, haircuts, digital music, and books. The product can be a single item or a plurality of items. For example, the product can be a tube of toothpaste, a box of laundry detergent, three shirts, and a donut.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

As used herein, the term "network" can include one or more local area networks (LANs) such as business networks, one or more wide area networks (WANs) such as the Internet, one or more cellular telephone networks, or any other type or combination of electronic or optical networks.

As used herein, the term "card" can refer to any card or other device that can be used to make a purchase in place of cash. For example, the card can be a bank card, credit card, debit card, gift card, or other device. The card can be a token, such as a hardware token or a software token. The card can be stored in and/or displayed upon a user device, such as a cellular telephone.

As used herein, the term "gift card" can include prepaid gift cards, gift cards that are not prepaid, gift certificates, accounts such as accounts associated with gift cards, and the like. The gift card can be a physical gift card or a digital, e.g., virtual, gift card.

Loading a gift card into a digital wallet, as used herein, can refer to transferring some or all of the money of the gift card to the digital wallet. Thus, the digital wallet can be used in place of or in addition to the gift card.

Thus, according to one or more embodiments, funds from a card, such as a gift card, can be loaded into a digital wallet. For example, the money can be transferred while the gift card is being purchased or immediately after the gift card is purchased. The money can be transferred at any desired time. The transfer can be performed without using an account management interface.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system, comprising:
    a non-transitory memory storing account information associated with a digital wallet of a user; and
    one or more hardware processors configured to execute instructions to perform operations comprising:
        scanning a prepaid card of the user to obtain an identifier associated with the prepaid card;
        accessing a database corresponding to a gift card issuer to determine an amount of funds corresponding to the identifier;
        transferring at least a portion of the funds from the prepaid card of the user into the digital wallet of the user, wherein the transferred funds are accessible from both the prepaid card and the digital wallet; and
        transferring at least a portion of the transferred funds from the digital wallet to a specified recipient as a gift.

2. The system of claim 1, wherein the prepaid card is a gift card and wherein the user is a purchaser of the gift card.

3. The system of claim 2, wherein the account information comprises gift card settings for the user.

4. The system of claim 3, wherein the gift card settings comprise a setting that specifies that the at least the portion of the funds are to be transferred to the specified recipient when the gift card is purchased.

5. The system of claim 3, wherein the gift card settings comprise a setting that specifies that the at least the portion of the funds comprises less than all of the funds.

6. The system of claim 5, wherein the gift card settings further comprise a setting that specifies that a remaining portion of the funds are to be used to make a purchase or a payment.

7. The system of claim 2, wherein the one or more hardware processors comprise one or more processors of a merchant device, and wherein the merchant device is located at a point of sale where the gift card was purchased.

8. The system of claim 2 wherein the non-transitory memory includes one or more memories of a server, the one or more hardware processors include one or more processors of the server, and the server is located remotely with respect to a point of sale where the gift card was purchased.

9. A system, comprising:
    a non-transitory memory storing account information associated with a digital wallet of a purchaser of a prepaid card; and
    one or more hardware processors configured to execute instructions to perform operations comprising:
        receiving input from the purchaser regarding a portion of funds associated with the prepaid card to be transferred to a recipient;
        processing a transfer of the portion of funds from the prepaid card of the purchaser into the digital wallet of the purchaser, wherein the transferring allows the portion of funds to be accessed from both the prepaid card and the digital wallet; and
        processing a transfer of the portion of the funds from the digital wallet to the recipient based on the received input from the purchaser.

10. The system of claim 9, wherein the operations further comprise receiving the input from the purchaser during a setup process prior to the transfer of the portion of funds from the prepaid card.

11. The system of claim 10, wherein the input includes instructions to transfer the portion of funds from the prepaid card automatically when the prepaid card is purchased.

12. The system of claim 11, wherein the one or more hardware processors comprise at least one processor of a merchant point of sale device configured to automatically process a transfer of the portion of funds from the prepaid card to the digital wallet.

13. The system of claim 9, wherein the input includes instructions to process the transfer of the portion of the funds to the recipient and to make a payment with a remaining portion of the funds.

14. The system of claim 9, wherein operations further comprise receiving the input after the transfer of the portion of funds from the prepaid card to the digital wallet, and wherein the input includes an authorization from the purchaser for the transfer of the portion of funds from the digital wallet to the recipient.

15. A method comprising:
    storing, using one or more hardware memories, account information associated with a digital wallet of a purchaser of a prepaid card; and receiving, using one or more hardware processors, input from the purchaser regarding a portion of funds associated with the prepaid card to be transferred to a recipient;

transferring, using the one or more hardware processors, the portion of funds from the prepaid card of the purchaser into the digital wallet of the purchaser, wherein the transferring allows the portion of funds to be accessed from both the prepaid card and the digital wallet; and transferring, using the one or more hardware processors, the portion of the funds from the digital wallet to the recipient based on the received input from the purchaser.

16. The method of claim 15, wherein the receiving the input comprises receiving the input from the purchaser during a setup process prior to the transfer of the portion of funds from the prepaid card.

17. The method of claim 16, wherein the receiving the input includes receiving instructions to transfer the portion of funds from the prepaid card automatically when the prepaid card is purchased.

18. The method of claim 17, wherein the transferring of the portion of funds from the prepaid card to the digital wallet comprises transferring the portion of funds from the prepaid card to the digital wallet using a merchant point of sale device.

19. The method of claim 15, wherein the receiving the input includes receiving instructions to transfer the portion of funds to the recipient and to make a payment with a remaining portion of funds.

20. The method of claim 15, wherein the receiving the input comprises receiving the input after the transfer of the portion of funds from the digital wallet to the recipient, and wherein the input includes an authorization from the purchaser for the transfer of the portion of funds.

* * * * *